United States Patent [19]

Latowski et al.

[11] 4,261,459
[45] Apr. 14, 1981

[54] CONTINUOUS GRATE TRACK LENGTH COMPENSATOR

[75] Inventors: Anthony A. Latowski; Rudolph M. Silvers, both of Pittsburgh, Pa.

[73] Assignee: Koppers Company, Inc., Pittsburgh, Pa.

[21] Appl. No.: 72,140

[22] Filed: Sep. 4, 1979

[51] Int. Cl.³ .......................... B65G 35/08
[52] U.S. Cl. .................. 198/795; 198/813; 238/228; 266/180
[58] Field of Search .............. 198/795, 813, 816, 838; 266/178, 180, 185, 279; 432/137, 239; 110/329, 330; 75/5; 104/118; 238/171, 228, 229

[56] References Cited

U.S. PATENT DOCUMENTS

| | | | |
|---|---|---|---|
| 2,745,659 | 5/1956 | Osojnak | 266/180 |
| 2,903,972 | 9/1959 | Schutze | 104/118 |
| 3,201,102 | 8/1965 | Stieler et al. | 266/180 |
| 3,666,254 | 5/1972 | Stanke | 266/180 |
| 3,918,894 | 11/1975 | Stanke et al. | 266/180 |

FOREIGN PATENT DOCUMENTS

| | | | |
|---|---|---|---|
| 601107 | 8/1934 | Fed. Rep. of Germany | 238/228 |
| 378334 | 8/1932 | United Kingdom | 266/180 |

*Primary Examiner*—Joseph E. Valenza
*Attorney, Agent, or Firm*—Donald M. MacKay; Oscar B. Brumback; Herbert J. Zeh

[57] ABSTRACT

An apparatus is provided for adjusting pallet wheel track length when the spacing between pallets changes due to temperature changes such as in the sintering of ore. The apparatus comprises pivotable arc segments which can be opened or closed to expand and contract the track length, a wedge-shaped casting positioned between said arc segments and slidable in and out at right angles to said track containing track to mate with said arc segments, drive means for moving said arc segments and wedge and a sensor means for detecting a change in pallet spacing and activating said drive means.

7 Claims, 3 Drawing Figures

CONTINUOUS GRATE TRACK LENGTH COMPENSATOR

BACKGROUND OF THE INVENTION

1. Field of the Invention

This invention relates generally to traveling grates such as those used in the heat processing of mineral ore as, for example, in the sintering or pelletizing of such ores and, more particularly, to apparatus for adjusting the position of the rails on which the pallets move in order to maintain a proper position of the pallets with respect to each other.

2. Description of the Prior Art

The travelling grate systems as conventionally used in the sintering and pelletizing process have an upper run and a lower run. The particulate material is charged to the grate at a feed zone at the beginning of the upper run, is passed through a treating zone where the material is subjected to heating and possibly cooling and then to a discharge zone where the material is discharged. The discharge zone is usually a transition zone between the upper and the lower runs. The grate then moves along the lower run back to the beginning of the upper run.

In such traveling grate systems, the pallets which include the grate and side members form a channel or pocket where the material being treated is carried. These pallets include wheels which run on trackways of the upper and lower runs. Conventionally, the pallet frames which pass over the machine tracks of each run are pushed from the feed zone to the discharge zone by the upper driving sprocket on the upper run and are returned from the discharge zone to the feed zone by gravity. The discharge zone usually is an arcuate or curved portion which is the transition between the upper and lower runs.

The side members of these pallets are carefully machined so that the sides of one pallet fit the sides of the subsequent and the preceeding pallets to provide a predetermined gap space, called a "pallet gap", between the pallets. Normally, a short gap is required between the push section of the upper zone and the gravity section of the lower zone. This short gap is known in the art as a "pallet track gap".

The traveling grate, being of metal, expands as it is heated and contracts as it is cooled. The length of the pallets change with the temperature and the length of the tracks or runways change with temperature. It is desirable to keep the distance or pallet gap between the pallet sides the same regardless of the operating conditions of the traveling grate, but this is difficult to accomplish, particularly as the condition of the traveling grate changes from a cold start condition to a full, steady start operating condition.

U.S. Pat No. 4,127,381 attempts to solve the problem resulting from temperature changes by placing the pallet drive sprocket on a pivotable lever so that the sprocket position can be changed to compensate for any misalignment of the pallet resulting from temperature changes. U.S. Pat. No. 3,765,525 tries to compensate for the change in temperature by adjusting the location of the shaft bearings, particularly the tail shaft bearing of the grate by way of a hydraulic mechanism so as to compensate for dimensional changes in the chains which drive the conveyor, which dimensional changes are caused by temperature changes to which the traveling grate conveyor is subjected.

As empirical solution has also been used. This solution is to design the length of the track which constitutes the upper and lower runs as long as possible, based upon the theory that the pallets will undergo a greater change with increasing temperatures than will the runway track. Thus, the practice according to this solution has been to space the distance between the pallets for the non-operating or cold conditions; i.e., design the "pallet gap" (the distance between the pallets) at this time deliberately long so that, as the length of the pallets expands with an increase in temperature, the gap between the pallets closes to a desired or acceptable operating gap. A condition employing this empirical solution, conventionally considered to be tolerable, was one in which the gap was satisfactory if the pallets were to be operating at least 90% of the lifetime of the machine in the hot condition. The problem with the empirical solution is that it required the machine to be designed to withstand the severe mechanical forces encountered when the machine was operating under a cold condition as in the start up of the operation.

SUMMARY OF THE INVENTION

The present invention provides a compensation so that the proper pallet wheel track length will be the optimum one despite the temperature conditions of the machine. The invention thus provides a system comprised of a sensor which monitors the gap between the pallets and a means responsible to the sensor for changing the length of travel of the pallets to maintain the optimum pallet gap.

DESCRIPTION OF THE PREFERRED EMBODIMENT

Figure 1:
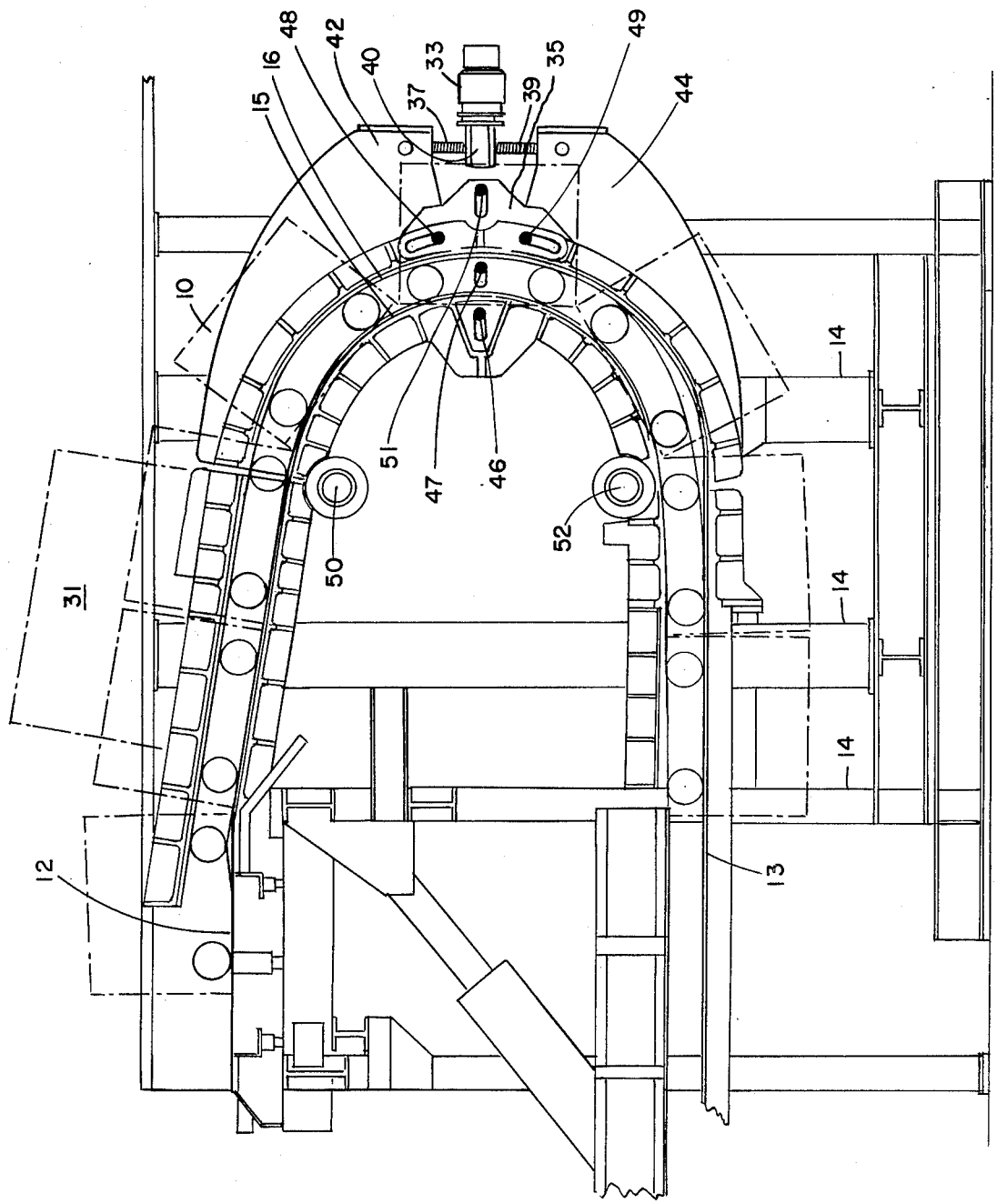
FIG. 1 is an elevational longitudinal sectional view of a sinter machine through one track of the discharge end.

In FIG. 1, an embodiment of the invention is incorporated in the discharge end of a conventional traveling grate that is to be used for the sintering of metal ores. Only one of the double track sides are shown. In a conventional fashion, the pallets (10) are comprised of a grate, slides and ends which form open containers in which the material to be treated is carried and move on an upper trackway (12) and lower trackway (13). These trackways are supported on a frame member (14) and are connected by trackways (15) and (16). The pallets (10) move from the upper trackway (12) to the lower trackway (13) through the arc formed by trackways (15) and (16).

The discharge zone is at the end of the trackway most remote from the feed zone (not shown). As the pallets (10) move down the slope section of the parallel rails, the material is emptied at the discharge zone from the pallets by gravity at the apex of the arc end section of the trackway. The pallets then move by gravity further downward onto the lower trackway. The pallets, at this point, are inverted from the original position in the upper trackway and each inverted pallet is pushed in succession by the next pallets in line. Thus, the pallets move as a pallet train along the lower trackway toward the feed end of the machine. At the feed end of the machine, conventional and therefore not shown, a set of gear tooth sprockets engage corresponding gear tooth sprockets in each pallet, thereby lifting it around a second arc end section of the trackway and driving it forward onto the upper trackway and cuasing it to push its predecessor pallet along the upper trackway; thus forming a pallet train on the upper trackway with each pallet being pushed by the one succeeding it. The foregoing is conventional.

In accordance with this invention, the gap that exists between the two consecutive pallets is monitored. This gap is most readily monitored as shown at the discharge area of the machine. When the pallet gap exceeds a predetermined amount, the arc lengths between the push section and the free return section is automatically varied so as to maintain the gap between the pallets at the predetermined value.

Referring now to FIG. 1, the means illustrated herein for monitoring the gap between the pallets is a camera system (31) which develops an output corresponding to the difference between a predetermined gap and the actual gap as viewed by the camera. A camera which is found to work well for such monitoring is a Reticon camera sold by Reticon Corporation of Sonnyville, California.

The arc length at the discharge end is varied in accordance with the output of the camera (31). The changing of the arc length is accomplished by way of an electric motor (33), and a pair of screws (37, 39) on a single shaft (40), said screws connected with arc segments (42) and (44) by a pivotable nut arrangement. The motor (33) is secured to a block that in turn is secured to the frame of the traveling grate machine. The shaft of the motor drives a gear reduction system which is connected to said shaft (40) and a pivotable nut arrangement attached to adjoining segments (42) and (44). The gear reduction system is supported by a shaft and spherical roller thrust bearing arrangement (not shown). A wedge-shaped casting (35), hereinafter referred to as "wedge", fitted with slotted track sections is mechanically moved horizontally by a pin and slotted hole arrangement (48) and (49) and is supported by pins (46), (47), (51), (48), and (49). This wedge (35) provides a continuous track length needed when the adjoining arc segments (42) and (44) are open, or the reduced track length when the adjoining arc segements are closed. Arc segments (42) and (44) are pivotably mounted at pivot points (50) and (52).

Figure 2:
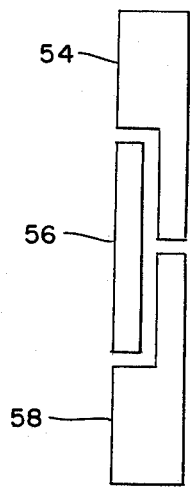
FIG. 2 is a top view of the mating of track between arc segments and a wedge spacer.
Figure 3:
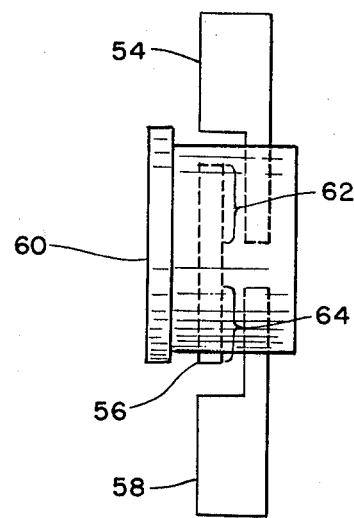
FIG. 3 is a top view of the partially open track when the wedge is withdrawn and the arc segments opened.

In operation, a signal from camera (31) may be received by motor (33) that the pallet gap is too wide or too narrow. If it is narrow, motor (33) will rotate shaft (40) and screws (37) and (39) to separate arc segments (42) and (44). Simultaneously with the movement of arc segments (42) and (44), wedge (35) is moved outward by the pressure applied by movable pins (48) and (49) against slots (48) and (49). Pins (48) and (49) are secured to arc segments (42) and (44). Wedge (35) is floating on and guided by immovable pins (46), (47) and (51) secured to frame of the travelling grate machine and contained within slots (46), (47), and (51). Thus as arc segments (42) and (44) are separated, wedge (35) is withdrawn and the gap created partially filled by L-shaped track on the wedge mating with corresponding track on arc segments (42) and (44). This arc length movement is accomplished with minimum distortion of original curves and radii by proper location of the curved track separations and pivot points. As shown in FIG. 2, the track is in a close position where rail (54) of arc segment (44) and rail (58) of arc segment (42) is mating with rail (56) of wedge (35). In FIG. 3, rails (54), (56) and (58) are separated but wheel (60) is allowed to ride on joined sections (62) and (64).

When the sensor detects that the pallets are separated too much, the above procedure is reversed. While the above procedure and configuration is preferred as only one drive means is required for each side of the double track by synchronized drive means to arc segments (42) and (44) as well as wedge (35), by employing two drive means, one for arc segments (42) and (44), and one for wedge (35), the wedge could be moved inwardly toward the center of the circle when the arc segments were separated and withdrawn when the arc segments were closed. The wedge would contain track for mating with adjoining arc segment track for both the open and closed positions.

What is claimed:

1. An apparatus for adjusting pallet wheel track length when the spacing between pallets changes, comprising on each side of a double track:
   (a) pivotable arc segments which can be opened or closed to expand and contract the track length, respectively;
   (b) a wedge positioned between said arc segments and slidable in and out at right angles to said track, said wedge containing track to mate with the track of said arc segments when said arc segments are opened or closed;
   (c) a drive means for moving said arc segments and wedge synchronized with drive means on the adjacent track; and
   (d) sensor means for detecting a change in spacing between pallets and activating said drive means to restore the former pallet spacing.

2. The apparatus of claim 1 wherein the wedge and arc segments are pivotably connected and a single drive means, on each side of the double track, moves both.

3. The apparatus of claim 1 wherein the wedge is supported by a plurality of pins in slots, the pivotable arc segments contain pins movable in slots which support said wedge and said slots are oriented such that the opening of the arc segments withdraws the wedge and the closing of the arc segments restores the wedge to the closed position.

4. The apparatus of claim 3 wherein the pins on the arc segments are movable within the slots and the pins solely supporting the wedge are immovable.

5. A method of adjusting pallet wheel track length when the spacing between pallets changes comprising detecting a change in spacing between pallets with a sensor means and activating a drive means for moving pivotable arc segments of said track which can be opened or closed to expand and contract the track length, respectively, and sliding a wedge, positioned between said arc segments, in and out at right angles to said track, said wedge containing track to mate with the track of said arc segments when said arc segments are opened or closed whereby said wedge is withdrawn when said arc segments are separated and returned to the closed position when the arc segments are closed.

6. The method of claim 5 wherein the wedge and arc segments are pivotaly connected whereby the opening and closing of the arc segments withdraws and returns the wedge to provide the required track.

7. The method of claim 5 wherein the wedge and arc segments are pivotably connected and a single drive means moves both.

* * * * *